United States Patent [19]

Pence et al.

[11] Patent Number: 5,436,721
[45] Date of Patent: Jul. 25, 1995

[54] WAFER TILT GAUGE

[75] Inventors: Paul Pence, Cedar Park; Greg Pollock, Austin, both of Tex.

[73] Assignee: Advanced Micro Devices, Inc., Austin, Tex.

[21] Appl. No.: 71,476

[22] Filed: Jun. 4, 1993

[51] Int. Cl.[6] ............................................. G01B 5/24
[52] U.S. Cl. ...................................... 356/154; 437/8; 356/448
[58] Field of Search ............... 356/152, 154, 448, 391; 250/492.2; 437/8

[56] References Cited

U.S. PATENT DOCUMENTS 5,042,945  7/1991  Shibata et al. ................... 356/154
5,101,226  3/1992  Beaulieu et al. ................. 355/53

Primary Examiner—Robert P. Limanek
Assistant Examiner—David B. Hardy
Attorney, Agent, or Firm—Jenkens & Gilchrist

[57] ABSTRACT

A wafer tilt gauge includes a base support, structure for temporarily connecting a slotted apparatus for holding wafers to the base support, a light beam target connected to the base support, and a light beam source connected to the base support. The various components are positioned so that a light beam emitted from the light beam source will bounce off of a wafer disposed in a temporarily connected slotted apparatus and subsequently impinge upon the light beam target. Further, the base support is rockable, so that a first point of impingement can be obtained for a disposed wafer with the base support rocked into a first position and so that a second point of impingement can be obtained for a disposed wafer with the base support rocked into a second position.

43 Claims, 2 Drawing Sheets

WAFER TILT GAUGE

BACKGROUND OF THE INVENTION

1. Field of the Invention

The present invention relates generally to wafer carriers. More particularly, the present invention relates to systems for ensuring such carriers are suitable for use.

2. Description of Related Art

Wafer carriers have been used for many years in the electronic arts, particularly the semiconductor arts, to support wafers during processing. Typical wafer carriers are described, for example, in U.S. Pat. Nos. 4,993,559; 4,355,974; 4,256,229; 4,515,104; 3,678,893; 3,534,862; 4,023,691; and 3,610,613, which are all incorporated herein by reference. Quartz is a common construction material for wafer carriers that are intended for use in high temperature processes. Other materials are also used.

The processing of wafers to make integrated circuit chips requires that they be successively immersed, sprayed and/or rinsed with liquids or gases. Some of the chemical baths include corrosive chemicals. Some involve very high temperatures. One such process that is frequently employed is chemical vapor deposition ("CVD"). CVD involves depositing a solid material from a gaseous phase onto a substrate by means of a chemical reaction. This deposition reaction is generally thermal decomposition, chemical oxidation, or chemical reduction. Chemical vapor deposition of electronic materials is described by T. L. Chu et al., J. Vac. Sci. Technol. 10: 1 (1973) and B. E. Watts, Thin Solid Films. 18: 1 (1973). They describe the formation and doping of epitaxial films of such materials as silicon, germanium and GaAs. A summary of the chemical vapor deposition field is provided by W. A. Bryant, "The Fundamentals of Chemical Vapour Deposition", Journal of Materials Science. 12: 1285 (1977). Low pressure CVD production of silicon dioxide deposits is summarized by R. Rossler, Solid State Technology, 63–70 (April 1977). The contents of each of the foregoing are incorporated herein by reference.

The positioning of a plurality of wafers in a row in a vapor deposition device has been previously described in U.S. Pat. No. 3,471,326, and placing them in a vertical orientation has been described in U.S. Pat. Nos. 3,922,467 and 4,018,183.

In CVD furnaces, spacing between wafers when disposed in a carrier is critical to maintain proper deposition uniformity. This spacing is determined by slots in the quartz carriers or "boats". The slots are typically formed by support rods. If these slots are too large, which is possible because of manufacturing error or because of excessive wear, carried wafers can acquire an undesired "tilt". Such a tilt can change the spacing between wafers, making the deposition nonuniform. This tilt is called "teepeeing" by those skilled in the art.

Needless to say, it is important to be able to determine the amount of wafer tilt to ensure that it falls within an acceptable range. Heretofore, those skilled in the art have mechanically measured slot width with plug gauges, calipers, and the like, and have used the measurements obtained by such means to estimate any associated tilt. A shortcoming of this approach is the fact that tilt is measured indirectly and, therefore, an error factor arises. Another shortcoming of this approach is the fact that it involves contact with the boat itself, and therefore ultimately causes boat wear. Yet another shortcoming of this approach is the fact that teepeeing arising due to sagging of the underlying supports (another common source of tilt) is not accurately detected by slot width measurement. Those skilled in the art have also devised other techniques for attempting to determine wafer tilt. Some, like laser imaging, are too expensive to be practical; others employ organics that ultimately damage boats being evaluated. In short, heretofore there has been a strong need in the art for a wafer tilt gauge that is inexpensive, accurate, and non-damaging to boats.

SUMMARY OF THE INVENTION

The present invention overcomes the shortcomings and deficiencies discussed above by providing a wafer tilt gauge including a base support, structure for temporarily connecting a slotted apparatus for holding wafers to the base support, a light beam target connected to the base support, and a light beam source connected to the base support. According to the teachings of the present invention, the various components are positioned so that a light beam emitted from the light beam source will bounce off of a wafer disposed in a temporarily connected slotted apparatus and subsequently impinge upon the light beam target. Further according to the teachings of the present invention, the base support is rockable, so that a first point of impingement can be obtained for a disposed wafer with the base support rocked into a first position and so that a second point of impingement can be obtained for a disposed wafer with the base support rocked into a second position.

Accordingly, it is an objective of the present invention to provide a device to precisely measure tilt or "teepeeing" of a wafer disposed in a wafer carrier.

Another object of the present invention is to provide a wafer tilt gauge that measures wafer tilt directly, without first mechanically or otherwise measuring wafer slot size.

Yet another object of the present invention is to provide a system for detecting teepeeing due to sagging of underlying supports, a type of teepeeing that cannot be detected by slot width measurement techniques.

BRIEF DESCRIPTION OF THE DRAWINGS

For a more complete understanding of the present invention, and for further objects and advantages thereof, reference may now be made to the following detailed description of the invention taken in conjunction with the accompanying drawings wherein.

DETAILED DESCRIPTION OF THE INVENTION

Figure 1:
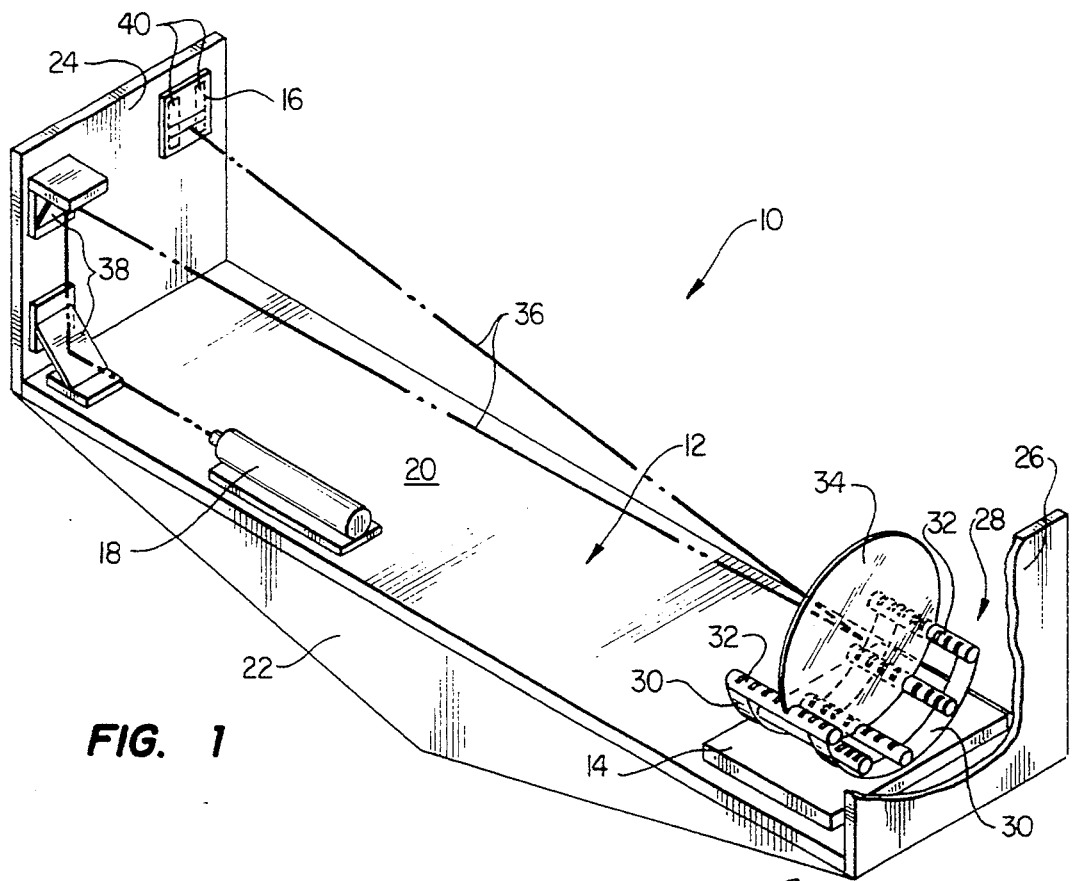
FIG. 1 is a perspective view of a wafer tilt gauge according to the teachings of the present invention.

Referring now to the drawings wherein the elements shown are not necessarily drawn to scale and wherein like or similar elements are designated with identical reference numerals throughout the several views and, more particularly, to FIG. 1, there is shown a perspective view of a wafer tilt gauge (generally designated by reference numeral 10) according to the teachings of the present invention.

In general, the wafer support gauge 10 may be seen in FIG. 1 to comprise a support structure (generally designated by reference numeral 12), structure 14 for temporarily connecting (or mounting) a slotted apparatus for holding wafers to the support structure, a light beam target 16 connected to the support structure, and a light beam source 18 connected to the support structure. Each of these elements 12, 14, 16, 18 and how they interact are discussed below.

Figure 2:
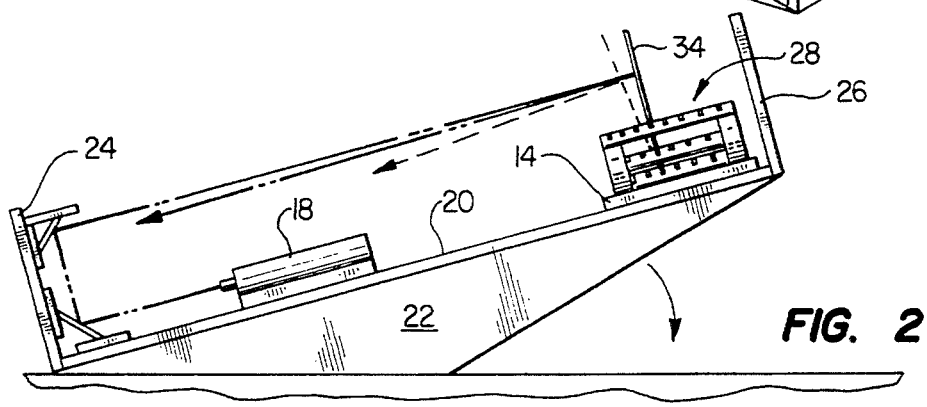
FIG. 2 is a side elevational view of the wafer tilt gauge of FIG. 1 in a first, extreme position.
Figure 3:
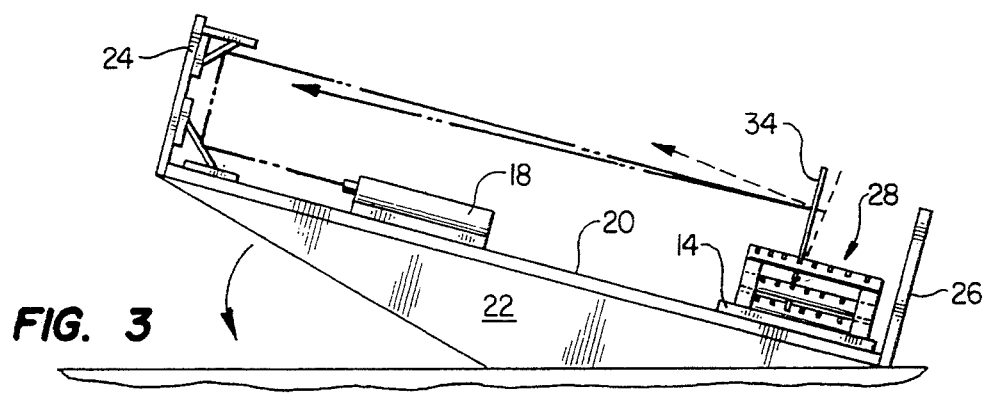
FIG. 3 is a side elevational view of the wafer tilt gauge of FIG. 2 in a second, extreme position.

The support structure 12 depicted in FIG. 1 may be seen to comprise an elongated platform 20 mounted on a triangular cross-sectioned, rockable base 22. For reasons that will become apparent from the discussion below, it is important to be able to place the platform 20 in a first extreme tilted position and in a second opposed, extreme tilted position. The rockable base 22 makes such placement, and the transitioning between such placement, relatively easy to obtain. FIG. 2, by way of example, shows the platform 20 rocked into a first position, leaning toward the left, and FIG. 3 shows the same platform 20 rocked into a second, opposed position, leaning toward the right. Because the rocking mechanism 22 has a triangular cross-section, it should be appreciated that the platform 20 can readily remain in either the first or second position until moved to the other.

In the particular embodiment of the present invention depicted in FIG. 1, it may be seen that the support structure 12 also includes a first end wall 24 and second end wall 26. Second end wall 26 is shown in partial cross section in FIG. 1 to facilitate the view of other components of the wafer tilt gauge 10, which components are discussed further below. The end walls 24 and 26 need not be present in an embodiment of the present invention. It is critical, however, according to the teachings of the present invention, that the support structure 12 rigidly hold the other components (that is, the structure 14, target 16, and source 18) in place. Because of how the components interact (and ultimately because wafers are generally held vertically in carriers) in all likelihood the target 16 need be held in a different plane than the structure 14 and/or source 18; thus, end wall 24 or other structure that offers an alternate support plane to the platform 20 will often be present in embodiments of the present invention. Also, an end wall like end wall 26 may be present in an embodiment of the present invention to perform a safety or some other such important function. End wall 26, as will become apparent from the discussion below, serves as a backplate for laser safety.

The support structure 12 may be formed of any one or more materials sufficiently strong to perform the support function described above. Wood or plastic or metal are three possible materials that could be used to form the support structure 12. Each of those materials, or any other suitable material, could be formed into an appropriate shape by conventional manufacturing techniques well known to those skilled in the art.

Before discussing the structure 14 for temporarily mounting slotted apparatus, it may be helpful to discuss the slotted apparatus themselves. On a very detailed level, such apparatus, including quartz boats and the like, are well known to those skilled in the art. In any event, these apparatus are discussed at length in the U.S. Patents listed in the description of related art section above, which patents have been incorporated by reference herein. Generally, though, referring to FIG. 1, it may be seen that a typical "boat" (generally designated by reference numeral 28) is formed of a number of U-shaped members 30 (two of which are shown in FIG. 1) which are held upright and spaced by a plurality of connected, parallel-disposed rods 32 (five of which are shown in FIG. 1). Continuing to refer to FIG. 1, it may be seen that the rods 32 are slotted or grooved, with the grooves disposed so that wafers (such as wafer 34 shown in FIG. 1) may be placed in a set of slots (one per rod 32) and thereby be held vertically upright.

Discussing now the slotted apparatus support structure 14, it is most important to realize that the function thereof is to hold a boat 28 in place during use of the gauge 10. In FIG. 1 this structure is depicted as a block of material on which a boat 28 can be held temporarily but rigidly in place while the gauge 10 is rocked and held in its two extreme positions. Any material that prevents a boat disposed thereon from moving even when substantially tilted could be used. The structure 14 could also have an indention therein to help hold a boat placed thereon. Also, in embodiments of the present invention it is possible that the structure 14 be manifested only in an indention in the platform 20. The only critical requirement of the structure 14 is it having the ability to temporarily hold a slotted apparatus in place to enable use of the gauge 10. It is also very important, however, that the structure 14 not foster contamination during use of the gauge 10. Those skilled in the art are well aware that silicon can contact quartz without causing contamination. Also, quartz on quartz does not foster contamination. Accordingly, because quartz boats will be often evaluated in the gauge 10, quartz would be a good material from which to construct the structure 14. A block of quartz with small walls to prevent boat movement would make a fine structure 14.

The target 16 is a position on the gauge where points of light impingement may be detected and noted. Referring to FIG. 1 it may be seen that a light beam 36 that originates in source 18 is reflected (via a set of mirrors 38) onto a wafer, where, because the wafer is highly polished, it is subsequently reflected off. This light beam 36 ultimately impinges upon the target 16.

It should be recognized that wafer slots allow wafers to fit rather loosely therein. This is important because a tight fit could cause wafer chipping or other damage. This looseness, however, allows the wafer to lean (or tilt) one way or the other in the slots. In fact, one of the functions of the gauge 10 is to determine the extremes of wafer tilt in any given set of slots. Because of this tilting, and because the wafer is in the path of light beam 36, the light beam 36 may ultimately impinge upon any one of a number of different spots on the target 16. As will become apparent from the discussion below, it is useful to be able to detect and note points of impingement and differences between points of impingement. To facilitate this noting, the target 16 may comprise a "scale", or "pass-fail" lines, or the like.

It should be recognized that wafer tilt can vary considerably, and ultimately obtained measurements can also vary considerably when the present invention is used to evaluate entirely different classes and sizes of boats. Accordingly, it may be useful to move the location of target 16. FIG. 1 shows one way to facilitate this. In FIG. 1 the target is shown connected to the wall 24 via magnets 40. These magnets 40 can be permanently affixed to the back of a separate target structure (if, for example, the wall 24 is made of metal) or they could be permanently affixed to the wall 24, and the target 16 constructed with a metal backing to facilitate readily removable and adjustable connection. Alternately, of course, both the wall and the target 16 could have magnets attached thereto for a possible stronger connection.

The final major element of the gauge 10 shown in FIG. 1 is the light beam source 18. This source can be a laser or some other such narrow light beam emitting apparatus. The only requirement for source 18 is that it provide a beam 36 that impinges at a detectable spot on the target 16 after being reflected off of a tilting wafer.

In operation of the gauge 10, a boat to be tested is placed into or onto the structure or holder 14. A polished wafer 34 of standard thickness is then placed into the boat. The light beam source 18 is then turned on. In FIG. 1, the light beam 36 emitted from the source 18 is reflected off of several mirrors 38 to get it to a desired height and to aim it at the wafer 34. The beam 36 subsequently bounces off of the polished wafer 34 and strikes the target 16. The gauge 10 is then first tilted forward or backward (i.e., as shown in FIG. 1 and FIG. 2). When the gauge 10 is tilted forward, the wafer 34 will tilt forward also, and the light beam 36 reflected to a first point on the target 10. After the first point is noted, the gauge 10 can be tilted in the opposite direction. This will cause a like change in direction of tilt of wafer 34, and the light beam 36 will be reflected on a second point on the target 16.

Figure 4:
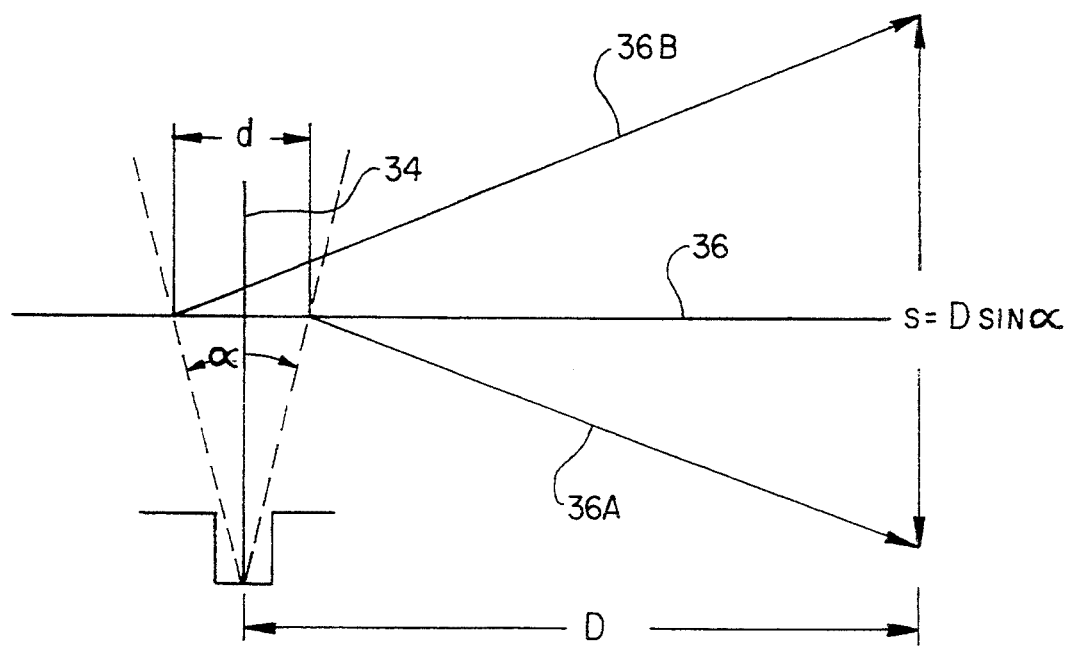
FIG. 4 is a depiction of important angles and measurements underlying operation of the present invention.

Referring now to FIG. 4, those skilled in the art should recognize that in use of the gauge 10 the distance between the first point obtained above and the second point obtained above is proportional to the size of the wafer's angle of tilt. Recognizing that FIG. 4 is not drawn to scale, it may still be appreciated that wafer 34 (towards the left) may tilt through an angle $\alpha$ and thereby traverse a distance t in a plane of interest (the entry plane of light beam 36). It may also be noted in FIG. 4 that the distance between the bottom of the wafer 34 and the above-mentioned plane of interest is a distance d and that the distance between the bottom of the wafer 34 and an associated target is a distance D. Referring still to FIG. 4, the angle between the reflected beam 36 when the wafer 34 is tilted forward (beam 36A in FIG. 4) and the reflected beam 36 when the wafer 34 is tilted backward (beam 36B in FIG. 4) is an angle $\beta$ which is approximately equal to angle $\alpha$ assuming that $D >> d$ and that $\alpha$ is small (i.e., $<5°$). Further, $t \cong T \, d/D$, which means that the wafer tilt is proportional to the measured change in distance and that it is dependent on the ratios of the distances d and D. Using the small angle approximation of sine, T is directly proportional to the angle of tilt measured in radians and dependent upon D. Thus, $T \cong D\alpha$ and, restated as solved for $\alpha$, $\alpha \cong T/D$. Based upon the foregoing, those skilled in the art should understand and appreciate that the measurement of $\alpha$ is independent of the location that the light beam strikes the wafer. They should also fully understand and appreciate from the foregoing that both the angle of tilt and the distance of tilt can be easily calculated by use of a gauge 10.

Using the mathematics above, many useful gauges can be constructed. For example, a scale for use on target 16 could be made to correspond to the wafer's tilt or, after testing both "good" and "bad" boats, a pass-fail limit could be determined.

The gauge 10 depicted in the FIGs. and described herein has many useful features. Since there may be a variation in the positioning of the boats, as previously mentioned, the target 16 is made mobile, affixed with magnets, so that the scale can be zeroed during each test. Also, the rocker 22 ensures a consistent amount of force on the wafers from one boat to the next. The gauge 10 also includes a backplate 26 for laser safety, although use of a low-power light source could render inclusion of it unnecessary.

Obviously, numerous modifications and variations are possible in view of the teachings above. Those skilled in the art should understand and appreciate that the larger the separation between the target 16 and the wafer 34, the more precise the measurements will be. Further modifications could include automatic electronic zeroing and measurement, motorized tilting, and use of a focused white-light source. Other modifications and variations are possible. Accordingly, within the scope of the appended claims, the present invention may be practiced otherwise than as specifically described herein.

What is claimed is:

1. A wafer tilt gauge comprising:
    a base support, which base support can rock from a first position to a second position, and which base support comprises a rocker structure having a triangular cross-section;
    means for temporarily mounting a slotted apparatus for holding wafers to said base support;
    a light beam target connected to said base support; and
    a light beam source connected to said base support, said light beam source positioned so that a light beam emitted therefrom will bounce off of a wafer disposed within said slotted apparatus temporarily connected by said means for temporarily connecting and so that said light beam will thereupon impinge upon said light beam target,
    whereby a first point of impingement can be obtained for said disposed wafer with said base support rocked into said first position and a second point of impingement can be obtained for said disposed wafer with said base support rocked into said second position.

2. The wafer tilt gauge as recited in claim 1, further comprising means for redirecting said light beam, said means for redirecting disposed between said light beam source and said wafer disposed within said slotted apparatus.

3. The wafer tilt gauge as recited in claim 1, wherein said light beam target is movably connected to said base support, and further comprising at least one magnet disposed between said light beam target and said base support to effect said moveable connection.

4. The wafer tilt gauge as recited in claim 1, wherein said means for temporarily mounting comprises a quartz block having an indention therein.

5. The wafer tilt gauge as recited in claim 1, wherein said light beam target comprises a portion having a scale thereon.

6. The wafer tilt gauge as recited in claim 1, wherein said light beam target comprises a portion having marks indicating a pass-fail limit.

7. The wafer tilt gauge as recited in claim 1, wherein said light beam source comprises a laser.

8. A method for determining the distance a wafer can tilt within a slot, said method comprising:
    disposing said wafer in a base support comprising a rocker structure having a triangular cross-section;
    tilting said wafer fully in a first direction;

reflecting a light beam off of said wafer tilted in said first direction and onto a light beam target;

tilting said wafer fully in a second direction; and reflecting a light beam off of said wafer tilted in said second direction and onto said light beam target.

9. The method as recited in claim 8, wherein said light beam impinges on said wafer at a first point when said wafer is tilted in said first direction, wherein said light beam impinges on said wafer at a second point when said wafer is tilted in a second direction, and further comprising noting the first point of light beam impingement on said light beam target when said wafer is tilted in said first direction, and noting the second point of light beam impingement on said light beam target when said wafer is tilted in said second direction.

10. A wafer tilt gauge comprising:

a base support, which base support can rock from a first position to a second position;

means for temporarily mounting a slotted apparatus for holding wafers to said base support;

a light beam target connected to said base support; and a light beam source connected to said base support, said light beam source positioned so that a light beam emitted therefrom will bounce off of a wafer disposed within a slotted apparatus temporarily connected by said means for temporarily connecting and so that said light beam will thereupon impinge upon said light beam target, whereby a first point of impingement can be obtained for a disposed wafer with said base support rocked into said first position and a second point of impingement can be obtained for said disposed wafer with said base support rocked into said second position, and wherein said light beam target is movably connected to said base support, and further comprising at least one magnet disposed between said light beam target and said base support to effect said moveable connection.

11. The wafer tilt gauge as recited in claim 10, further comprising means for redirecting said light beam, said means for redirecting disposed between said light beam source and said wafer disposed within said slotted apparatus.

12. The wafer tilt gauge as recited in claim 10, wherein said means for temporarily mounting comprises a quartz block having an indention therein.

13. The wafer tilt gauge as recited in claim 10, wherein said light beam target comprises a portion having a scale thereon.

14. The wafer tilt gauge as recited in claim 10, wherein said light beam target comprises a portion having marks indicating a pass-fail limit.

15. The wafer tilt gauge as recited in claim 10, wherein said light beam source comprises a laser.

16. The wafer tilt gauge as recited in claim 10, wherein said base support comprises a rocker structure having a triangular cross-section.

17. A wafer tilt gauge comprising:

a base support, which base support can rock from a first position to a second position;

means for temporarily mounting a slotted apparatus for holding wafers to said base support;

a light beam target connected to said base support; and a light beam source connected to said base support, said light beam source positioned so that a light beam emitted therefrom will bounce off of a wafer disposed within a slotted apparatus temporarily connected by said means for temporarily connecting and so that said light beam will thereupon impinge upon said light beam target, whereby a first point of impingement can be obtained for said disposed wafer with said base support rocked into said first position and a second point of impingement can be obtained for said disposed wafer with said base support rocked into said second position, and wherein said light beam target comprises a portion having a scale thereon.

18. The wafer tilt gauge as recited in claim 17, further comprising means for redirecting said light beam, said means for redirecting disposed between said light beam source and said wafer disposed within said slotted apparatus.

19. The wafer tilt gauge as recited in claim 17, wherein said light beam target is movably connected to said base support, and further comprising at least one magnet disposed between said light beam target and said base support to effect said moveable connection.

20. The wafer tilt gauge as recited in claim 17, wherein said means for temporarily mounting comprises a quartz block having an indention therein.

21. The wafer tilt gauge as recited in claim 17, wherein said light beam target comprises a portion having marks indicating a pass-fail limit.

22. The wafer tilt gauge as recited in claim 17, wherein said light beam source comprises a laser.

23. The wafer tilt gauge as recited in claim 17, wherein said base support comprises a rocker structure having a triangular cross-section.

24. A wafer tilt gauge comprising:

a base support, which base support can rock from a first position to a second position;

means for temporarily mounting a slotted apparatus for holding wafers to said base support;

a light beam target connected to said base support; and a light beam source connected to said base support, said light beam source positioned so that a light beam emitted therefrom will bounce off of a wafer disposed within a slotted apparatus temporarily connected by said means for temporarily connecting and so that said light beam will thereupon impinge upon said light beam target, whereby a first point of impingement can be obtained for said disposed wafer with said base support rocked into said first position and a second point of impingement can be obtained for said disposed wafer with said base support rocked into said second position, and wherein said means for temporarily mounting comprises a quartz block having an indention therein.

25. The wafer tilt gauge as recited in claim 24, further comprising means for redirecting said light beam, said means for redirecting disposed between said light beam source and said wafer disposed within said slotted apparatus.

26. The wafer tilt gauge as recited in claim 24, wherein said light beam target is movably connected to said base support, and further comprising at least one magnet disposed between said light beam target and said base support to effect said moveable connection.

27. The wafer tilt gauge as recited in claim 24, wherein said light beam target comprises a portion having a scale thereon.

28. The wafer tilt gauge as recited in claim 24, wherein said light beam target comprises a portion having marks indicating a pass-fail limit.

29. The wafer tilt gauge as recited in claim 24, wherein said light beam source comprises a laser.

30. The wafer tilt gauge as recited in claim 24, wherein said base support comprises a rocker structure having a triangular cross-section.

31. A wafer tilt gauge comprising:
a base support, which base support can rock from a first position to a second position;
means for temporarily mounting a slotted apparatus for holding wafers to said base support;
a light beam target connected to said base support; and
a light beam source connected to said base support, said light beam source positioned so that a light beam emitted therefrom will bounce off of a wafer disposed within a slotted apparatus temporarily connected by said means for temporarily connecting and so that said light beam will thereupon impinge upon said light beam target,
whereby a first point of impingement can be obtained for said disposed wafer with said base support rocked into said first position and a second point of impingement can be obtained for said disposed wafer with said base support rocked into said second position, and wherein said light beam target comprises a portion having marks indicating a pass-fail limit.

32. The wafer tilt gauge as recited in claim 31, further comprising means for redirecting said light beam, said means for redirecting disposed between said light beam source and said wafer disposed within said slotted apparatus.

33. The wafer tilt gauge as recited in claim 31, wherein said light beam target is movably connected to said base support, and further comprising at least one magnet disposed between said light beam target and said base support to effect said movable connection.

34. The wafer tilt gauge as recited in claim 31, wherein said means for temporarily mounting comprises a quartz block having an indention therein.

35. The wafer tilt gauge as recited in claim 31, wherein said light beam target comprises a portion having a scale thereon.

36. The wafer tilt gauge as recited in claim 31, wherein said light beam source comprises a laser.

37. The wafer tilt gauge as recited in claim 31, wherein said base support comprises a rocker structure having a triangular cross-section.

38. A method for determining the distance a wafer can tilt within a slot, said method comprising steps of:
tilting said wafer fully in a first direction;
reflecting a light beam off of said wafer tilted in said first direction and onto a light beam target movably connected with a magnet to a base support;
tilting said wafer fully in a second direction; and
reflecting a light beam off of said wafer tilted in said second direction and onto said light beam target.

39. The method as recited in claim 38, further comprising steps of noting a point of light-beam impingement on said light beam target when said wafer is tilted in said first direction, and noting a point of light beam impingement on said light beam target when said wafer is tilted in said second direction.

40. A method for determining the distance a wafer can tilt within a slot, said method comprising steps of:
tilting said wafer fully in a first direction;
reflecting a light beam off of said wafer tilted in said first direction and onto a light beam target having marks indicating a pass-fail limit;
tilting said wafer fully in a second direction; and
reflecting a light beam off of said wafer tilted in said second direction and onto said light beam target.

41. The method as recited in claim 40, further comprising steps of noting a point of light-beam impingement on said light beam target when said wafer is tilted in said first direction, and noting a point of light beam impingement on said light beam target when said wafer is tilted in said second direction.

42. A method for determining the distance a wafer can tilt within a slot, said method comprising steps of:
tilting said wafer fully in a first direction;
reflecting a light beam off of said wafer tilted in said first direction and onto a light beam target having a scale thereon;
tilting said wafer fully in a second direction; and
reflecting a light beam off of said wafer tilted in said second direction and onto said light beam target.

43. The method as recited in claim 42, further comprising steps of noting a point of light-beam impingement on said light beam target when said wafer is tilted in said first direction, and noting a point of light beam impingement on said light beam target when said wafer is tilted in said second direction.

* * * * *